(12) United States Patent
Fukui

(10) Patent No.: US 7,291,671 B2
(45) Date of Patent: Nov. 6, 2007

(54) THERMOCONDUCTIVE SILICONE COMPOSITION

(75) Inventor: Hiroshi Fukui, Chiba Prefecture (JP)

(73) Assignee: Dow Corning Toray Company, Ltd., Tokyo (JP)

( * ) Notice: Subject to any disclaimer, the term of this patent is extended or adjusted under 35 U.S.C. 154(b) by 63 days.

(21) Appl. No.: 10/544,909

(22) PCT Filed: Feb. 9, 2004

(86) PCT No.: PCT/JP2004/001356

§ 371 (c)(1),
(2), (4) Date: Feb. 27, 2006

(87) PCT Pub. No.: WO2004/072181

PCT Pub. Date: Aug. 26, 2004

(65) Prior Publication Data

US 2006/0135687 A1    Jun. 22, 2006

(30) Foreign Application Priority Data

Feb. 13, 2003   (JP) .............................. 2003-034744

(51) Int. Cl.
*C08L 83/06*    (2006.01)
(52) U.S. Cl. ........................ 524/588; 528/24; 528/31; 528/32
(58) Field of Classification Search ............ 528/588, 528/31, 32, 23
See application file for complete search history.

(56) References Cited

U.S. PATENT DOCUMENTS 6,306,957 B1   10/2001   Nakano et al.

6,380,301 B1   4/2002   Enami et al.
2002/0077439 A1*   6/2002   Sakurai et al. ............... 528/10

FOREIGN PATENT DOCUMENTS

| EP | 0 745 643 | 5/1996 |
| EP | 0 839 869 | 7/1998 |
| EP | 1 101 798 | 11/2000 |
| JP | 2000-256558 | 9/2000 |
| JP | 2001-139815 | 5/2001 |

OTHER PUBLICATIONS

English language Abstract for JP 2000-256558 extracted from espacenet.com database dated May 3, 2005.
English language Abstract for JP 2001-139815 extracted from espacenet.com database dated May 3, 2005.

* cited by examiner

*Primary Examiner*—Kuo-Liang Peng

(57) ABSTRACT

A thermoconductive silicone composition comprising: (A) an organopolysiloxane (excluding component (C)), (B) a thermoconductive filler, and (C) at least two organopolysiloxanes as defined by the following general formula that have different values for the subscript n (I), wherein each $R^1$ is independently selected from monovalent hydrocarbon groups; $R^2$ is an oxygen atom or divalent hydrocarbon group; $R^3$ is an alkyl, alkoxyalkyl, alkenyl, or acyl; n is an integer from 5 to 100; and a is an integer from 1 to 3

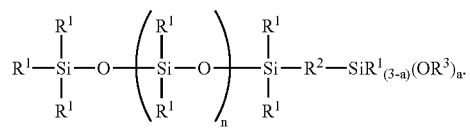

13 Claims, No Drawings

THERMOCONDUCTIVE SILICONE COMPOSITION

TECHNICAL FIELD

This invention relates to thermoconductive silicone compositions. More particularly, this invention relates to thermoconductive silicone compositions possessing good handling properties despite containing a large amount of thermoconductive filler used to obtain highly thermoconductive silicone compositions.

BACKGROUND

Thermoconductive silicone compositions have entered into use for the purpose of high-efficiency heat dissipation accompanying the higher densities and higher levels of integration seen in hybrid ICs and printed-circuit substrates carried by electronic components such as transistors, ICs, memory elements, and so forth. These thermoconductive silicone compositions take the form of, for example, thermoconductive silicone greases, thermoconductive silicone gel compositions, and thermoconductive silicone rubber compositions.

With the goal of improving the thermal conductivity of such thermoconductive silicone compositions containing a large amount of thermoconductive filler, for example, Japanese Laid Open (Unexamined or Kokai or A) Patent Application Number 2000-256558 discloses a thermoconductive silicone rubber composition comprising an organopolysiloxane, hydrolyzable group-functional methylpolysiloxane, thermoconductive filler, and curing agent. Japanese Laid Open (Unexamined or Kokai or A) Patent Application Number 2001-139815 discloses a thermoconductive silicone rubber composition comprising a curable organopolysiloxane, curing agent, and thermoconductive filler whose surface has been treated with oligosiloxane bearing Si-bonded alkoxy.

However, when these thermoconductive silicone compositions are subjected to still loaded with an even larger amount of thermoconductive filler, e.g., alumina, to raise the thermal conductivity, the viscosity of the resulting compositions undergoes a sharp increase and the handling and molding properties suffer from a substantial decline.

The object of this invention is to provide a thermoconductive silicone composition exhibiting good handling properties despite containing a large amount of thermoconductive filler in order to obtain a highly thermoconductive silicone composition.

DISCLOSURE OF THE INVENTION

The present invention relates to a thermoconductive silicone composition comprising:
(A) an organopolysiloxane (excluding component (C), infra),
(B) a thermoconductive filler, and
(C) at least two organopolysiloxanes as defined by the following general formula that have different values for the subscript n

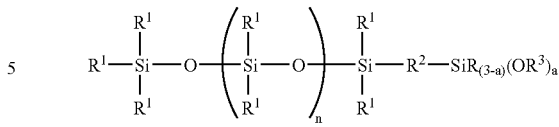

wherein each $R^1$ is independently selected from monovalent hydrocarbon groups; $R^2$ is an oxygen atom or divalent hydrocarbon group; $R^3$ is an alkyl, alkoxyalkyl, alkenyl, or acyl; n is an integer from 5 to 100; and a is an integer from 1 to 3.

DETAILED DESCRIPTION OF THE INVENTION

The inventive composition comprises the above-described components (A), (B), and (C) and thus can be noncuring. Alternatively, by the inclusion of (D) a curing agent, the composition can be rendered curable into a gel or rubber cured product. The curing mechanism employed by the curable implementation of the inventive composition is not restricted and can be exemplified by a hydrosilylation reaction, condensation reaction, and organoperoxide-induced free radical reaction. The hydrosilylation reaction is preferred for its rapid cure without the generation of by-products.

Component (A) comprises an organopolysiloxane other than component (C). The Si-bonded groups in component (A) can be exemplified by straight-chain alkyl such as methyl, ethyl, propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl; branched-chained alkyl such as isopropyl, tert-butyl, isobutyl, 2-methylundecyl, and 1-hexylheptyl; cyclic alkyl such as cyclopentyl, cyclohexyl, and cyclododecyl; alkenyl such as vinyl, allyl, butenyl, pentenyl, and hexenyl; aryl such as phenyl, tolyl, and xylyl; aralkyl such as benzyl, phenethyl, and 2-(2,4,6-trimethylphenyl)propyl; and halogenated alkyl such as 3,3,3-trifluoropropyl and 3-chloropropyl. Alkyl, alkenyl, and aryl are preferred, among which methyl, vinyl, and phenyl are particularly preferred. While the viscosity of component (A) at 25° C. is not restricted, this value is preferably 20 to 100,000 milliPascal·seconds (mPa·s), more preferably 50 to 100,000 mPa·s, even more preferably 50 to 50,000 mPa·s, and particularly preferably 100 to 50,000 mPa·s. The physical properties of the resulting silicone composition fall off substantially when the viscosity at 25° C. is below the lower limit on the preceding range, while the handling properties of the resulting silicone composition fall off substantially when the upper limit on the preceding range is exceeded. The molecular structure of component (A) is also not restricted and this component can have, for example, a straight-chain, branched-chain, partially branched straight-chain, or dendritic structure; however, straight-chain and partially branched straight-chain structures are preferred. Component (A) can be a homopolymer having a molecular structure as listed above, or a copolymer composed of a molecular structure as listed above, or a mixture of such polymers.

Component (A) can be exemplified by
dimethylvinylsiloxy-endblocked dimethylpolysiloxanes;
methylphenylvinylsiloxy-endblocked dimethylpolysiloxanes;

dimethylvinylsiloxy-endblocked dimethylsiloxane-methylphenylsiloxane copolymers;
dimethylvinylsiloxy-endblocked dimethylsiloxane-methylvinylsiloxane copolymers;
trimethylsiloxy-endblocked dimethylsiloxane-methylvinylsiloxane copolymers;
dimethylvinylsiloxy-endblocked methyl(3,3,3-trifluoropropyl)polysiloxanes;
silanol-endblocked dimethylsiloxane-methylvinylsiloxane copolymers;
silanol-endblocked dimethylsiloxane-methylvinylsiloxane-methylphenylsiloxane copolymers;
organosiloxane copolymers consisting of $(CH_3)_3SiO_{1/2}$ siloxane unit, $(CH_3)_2(CH_2=CH)SiO_{1/2}$ siloxane unit, $CH_3SiO_{3/2}$ siloxane unit, and $(CH_3)_2SiO_{2/2}$ siloxane unit;
silanol-endblocked dimethylpolysiloxanes;
silanol-endblocked dimethylsiloxane-methylphenylsiloxane copolymers;
trimethoxysiloxy-endblocked dimethylpolysiloxanes;
trimethoxysiloxy-endblocked dimethylsiloxane-methylphenylsiloxane copolymers;
methyldimethoxysiloxy-endblocked dimethylpolysiloxanes;
triethoxysiloxy-endblocked dimethylpolysiloxanes;
trimethoxysilylethyl-endblocked dimethylpolysiloxanes; and
mixtures of two or more selections from the preceding.

When the inventive composition is cured by means of a hydrosilylation reaction, component (A) should be an organopolysiloxane containing an average of at least 0.1 silicon-bonded alkenyl groups per molecule, and is preferably an organopolysiloxane containing an average of at least 0.5 silicon-bonded alkenyl groups per molecule, and particularly preferably is an organopolysiloxane containing an average of at least 0.8 silicon-bonded alkenyl groups per molecule. There is a tendency for cure of the overall composition to be unacceptable when the average number of alkenyl in each molecule falls below the lower limit on the preceding range. This alkenyl can be exemplified by the same alkenyl groups already listed above, with vinyl being preferred. The non-alkenyl silicon-bonded groups in the organopolysiloxane under consideration can be exemplified by the same straight-chain alkyl, branched-chain alkyl, cyclic alkyl, aryl, aralkyl, and halogenated alkyl already listed above, with alkyl and aryl being preferred and methyl and phenyl being particularly preferred. While the viscosity of this organopolysiloxane at 25° C. is not restricted, this value preferably is 20 to 100,000 mPa·s, more preferably 50 to 100,000 mPa·s, even more preferably 50 to 50,000 mPa·s, and particularly preferably 100 to 50,000 mPa·s. The physical properties of the resulting cured silicone fall off substantially when the viscosity at 25° C. is below the lower limit on the preceding range, while the handling properties of the resulting silicone composition fall off substantially when the upper limit on the preceding range is exceeded. The molecular structure of the organopolysiloxane under consideration is also not restricted and this organopolysiloxane can have, for example, the same structures as listed above, with straight-chain and partially branched straight-chain structures being preferred. The organopolysiloxane can be, for example, a homopolymer having a molecular structure as listed above, or a copolymer composed of a molecular structure as listed above, or a mixture of such polymers. This organopolysiloxane can be exemplified by the alkenyl-functional organopolysiloxanes already listed above.

When the inventive composition is cured by means of a condensation reaction, component (A) should be organopolysiloxane containing at least 2 silanol or Si-bonded hydrolyzable groups per molecule. This hydrolyzable group can be exemplified by alkoxy groups such as methoxy, ethoxy, and propoxy; alkenoxy groups such as vinyloxy, propenoxy, isopropenoxy, and 1-ethyl-2-methylvinyloxy; alkoxyalkoxy such as methoxyethoxy, ethoxyethoxy, and methoxypropoxy; acyloxy groups such as acetoxy and octanoyloxy; ketoxime groups such as dimethylketoxime and methylethylketoxime; amino groups such as dimethylamino, diethylamino, and butylamino; aminoxy groups such as dimethylaminoxy and diethylaminoxy; and amide groups such as N-methylacetamide and N-ethylacetamide. The other silicon-bonded groups in the organopolysiloxane under consideration, that is, the silicon-bonded groups other than the silanol and silicon-bonded hydrolyzable groups, can be exemplified by the same straight-chain alkyl, branched-chain alkyl, cyclic alkyl, alkenyl, aryl, aralkyl, and halogenated alkyl already listed above. While the viscosity of this organopolysiloxane at 25° C. is not restricted, this value preferably is 20 to 100,000 mPa·s, more preferably 50 to 100,000 mPa·s, and particularly preferably 100 to 100,000 mPa·s. The physical properties of the resulting cured silicone fall off substantially when the viscosity at 25° C. is below the lower limit on the preceding range, while the handling properties of the resulting silicone composition fall off substantially when the upper limit on the preceding range is exceeded. The molecular structure of the organopolysiloxane under consideration is also not restricted and this organopolysiloxane can have, for example, the same structures as listed above, with straight-chain and partially branched straight-chain structures being preferred. This organopolysiloxane can be exemplified by those organopolysiloxanes already listed above that have at least two silanols or Si-bonded hydrolyzable groups in each molecule.

When the inventive composition is cured by means of an organoperoxide-induced free radical reaction, the organopolysiloxane (A) is not restricted, but is preferably organopolysiloxane containing at least one silicon-bonded alkenyl group per molecule. The silicon-bonded groups in the organopolysiloxane under consideration can be exemplified by the same straight-chain alkyl, branched-chain alkyl, cyclic alkyl, alkenyl, aryl, aralkyl, and halogenated alkyl already listed above, wherein alkyl, alkenyl, and aryl are preferred and methyl, vinyl, and phenyl are particularly preferred. While the viscosity of this organopolysiloxane at 25° C. is not restricted, this value preferably is 20 to 100,000 mPa·s, more preferably 50 to 100,000 mPa·s, even more preferably 50 to 50,000 mPa·s, and particularly preferably 100 to 50,000 mPa·s. The physical properties of the resulting cured silicone fall off substantially when the viscosity at 25° C. is below the lower limit on the preceding range, while the handling properties of the resulting silicone composition fall off substantially when the upper limit on the preceding range is exceeded. The molecular structure of the organopolysiloxane under consideration is also not restricted and this organopolysiloxane can have, for example, the same structures as listed above, with straight-chain and partially branched straight-chain structures being preferred. The organopolysiloxane under consideration can be, for example, a homopolymer having a molecular structure as listed above, or a copolymer composed of a molecular structure as listed above, or a mixture of such polymers. This organopolysiloxane can be exemplified by the organopolysiloxanes already listed above.

Component (B) is thermoconductive filler used to impart thermal conductivity to the present composition. This component can be exemplified by metal powders such as aluminum powder, copper powder, and nickel powder; metal oxide powders such as alumina powder, magnesium oxide powder, beryllium oxide powder, chromium oxide powder, and titanium oxide powder; metal nitride powders such as boron nitride powder and aluminum nitride powder; metal carbide powders such as boron carbide powder, titanium carbide powder, and silicon carbide powder; and mixtures of two or more selections from the preceding. The morphology of component (B) can be, for example, spherical, acicular, plate-like, cylindrical, or irregular. When the inventive composition, or the cured silicone afforded by cure of the inventive composition, must have electrical insulating properties, component (B) is preferably metal oxide powder, metal nitride powder, or metal carbide powder and particularly preferably is alumina powder. The average particle size of component (B) is not restricted, but is preferably 0.1 to 100 micrometers (μm) and more preferably is 0.1 to 50 μm. When alumina powder is used as the thermoconductive filler (B), it preferably takes the form of a mixture consisting of ($B_1$) a spherical alumina powder with an average particle size of 5 to 50 μm (excluding 5 μm) and ($B_2$) a spherical or irregularly shaped alumina powder with an average particle size of 0.1 to 5 μm. The content of component ($B_1$) in this mixture is preferably 30 to 90 weight %, and the content of ($B_2$) is preferably 10 to 70 weight %.

The content of component (B) in the present composition is not restricted, but in order to produce a silicone composition exhibiting an excellent thermal conductivity the inventive composition preferably contains, in terms of volume %, at least 30 volume %, more preferably 30 to 90 volume % and particularly preferably 80 to 90 volume % component (B). In terms of weight %, the component (B) content in the inventive composition in order to produce a silicone composition exhibiting an excellent thermal conductivity is preferably at least 50 weight %, more preferably 70 to 98 weight %, and particularly preferably 90 to 97 weight %. In specific terms, the component (B) content is preferably 500 to 2,500 parts by weight per 100 parts by weight of component (A), more preferably 500 to 2,000 parts by weight per 100 parts by weight of component (A), and particularly preferably 800 to 2,000 parts by weight per 100 parts by weight of component (A). There is a tendency for the thermal conductivity of the resulting silicone composition to be inadequate when the component (B) content falls below the lower limit on the aforementioned range. Exceeding the upper limit on the aforementioned range tends to result in the appearance of such problems as an excessively high viscosity for the resulting silicone composition, an inability to uniformly disperse component (B) in the resulting silicone composition, and a substantial decline in the handling properties of the silicone composition.

Component (C) comprises at least two organopolysiloxanes as defined by the following general formula that have different values for the subscript n.

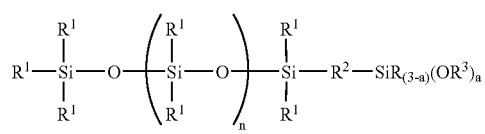

This component is added to generate an excellent moldability and avoid a deterioration in the handling properties of the composition even when elevated amounts of the thermoconductive filler (B) are employed for the purpose of producing a highly thermoconductive silicone composition. Each $R^1$ in the preceding formula is independently selected from monovalent hydrocarbon groups and can be exemplified by the same straight-chain alkyl, branched-chain alkyl, cyclic alkyl, alkenyl, aryl, aralkyl, and halogenated alkyl already listed above. Alkyl, alkenyl, and aryl are preferred for $R^1$, while methyl and phenyl are specifically preferred for $R^1$. $R^2$ in the preceding formula is the oxygen atom or divalent hydrocarbon group. The divalent hydrocarbon group encompassed by $R^2$ can be exemplified by ethylene, propylene, butylene, and methylethylene with ethylene and propylene being preferred. $R^3$ in the preceding formula is alkyl, alkoxyalkyl, alkenyl, or acyl. The alkyl encompassed by $R^3$ can be exemplified by the same straight-chain alkyl, branched-chain alkyl, and cyclic alkyl already listed in the preceding; the alkoxyalkyl encompassed by $R^3$ can be exemplified by methoxyethyl and methoxypropyl; the alkenyl encompassed by $R^3$ can be exemplified by the same alkenyl already listed in the preceding; and the acyl encompassed by $R^3$ can be exemplified by acetyl and octanoyl. $R^3$ is preferably alkyl and particularly preferably is methyl or ethyl. The subscript a in the preceding formula is an integer from 1 to 3 and is preferably 3. The subscript n in the preceding formula is an integer from 5 to 100. Component (C) characteristically comprises at least two organopolysiloxanes that have different values for the subscript n in the preceding formula. Component (C) preferably consists of two organopolysiloxanes whose n values differ by at least 10, more preferably comprises two organopolysiloxanes whose n values differ by at least 20, even more preferably comprises two organopolysiloxanes whose n values differ by at least 30, and particularly preferably comprises two organopolysiloxanes whose n values differ by at least 50. The proportions of the individual organopolysiloxanes making up component (C) are not restricted; however, when component (C) consists of two organopolysiloxanes with different n values, the weight ratio between the organopolysiloxane with the larger n value and the organopolysiloxane with the smaller n value is preferably from 1:10 to 10:1.

Component (C) can be exemplified by:

the combination of dimethylpolysiloxane with the formula

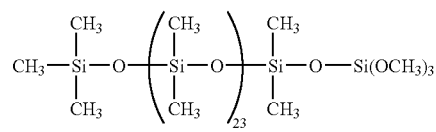

and dimethylpolysiloxane with the formula

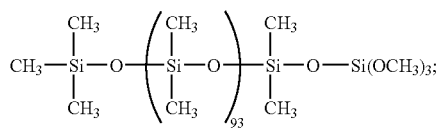

the combination of dimethylpolysiloxane with the formula

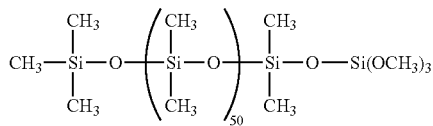

and dimethylpolysiloxane with the formula

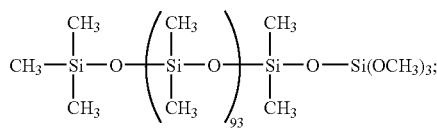

the combination of dimethylpolysiloxane with the formula

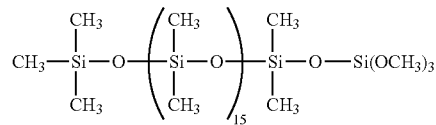

and dimethylpolysiloxane with the formula

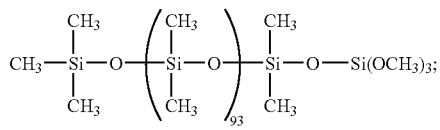

the combination of dimethylpolysiloxane with the formula

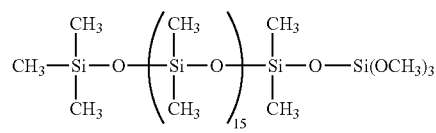

and dimethylpolysiloxane with the formula

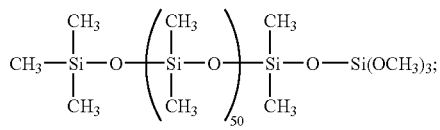

the combination of dimethylpolysiloxane with the formula

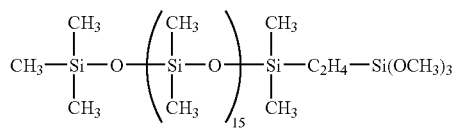

and dimethylpolysiloxane with the formula

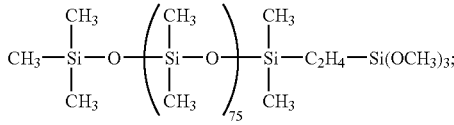

the combination of dimethylpolysiloxane with the formula

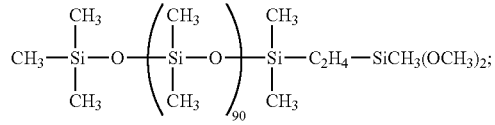

and dimethylpolysiloxane with the formula

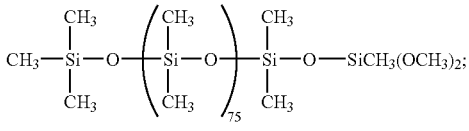

the combination of dimethylpolysiloxane with the formula

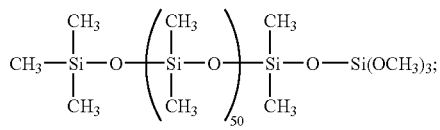

and dimethylpolysiloxane with the formula

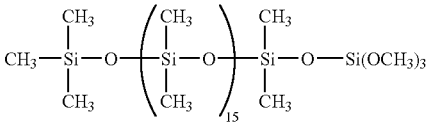

the combination of dimethylpolysiloxane with the formula and dimethylsiloxane-methylphenylsiloxane copolymer with the formula

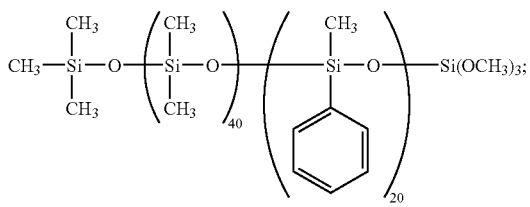

and the combination of dimethylpolysiloxane with the formula

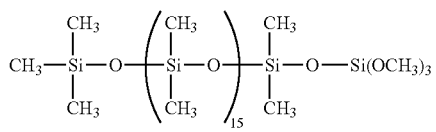

and the dimethylpolsiloxane copolymer with the formula

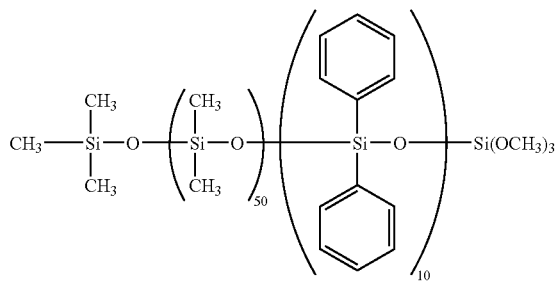

While the component (C) content in the inventive composition is not specifically restricted, component (C) should be present in sufficient quantity to treat the surface of component (B) and improve its dispersibility in the resulting thermoconductive silicone composition. In specific terms the content of component (C) is preferably 0.1 to 10 parts by weight per 100 parts by weight of component (B), and particularly preferably 0.1 to 5 parts by weight per 100 parts by weight of component (B). When the content of component (C) falls below the lower limit of the aforementioned range, problems such as a decline in the moldability of the resulting silicone composition and component (B) sedimentation/separation during storage of the silicone composition will tend to occur at high content of component (B). The physical properties of the resulting silicone composition fall off when the upper limit of the aforementioned range is exceeded.

The procedure for introducing component (C) into the inventive composition can be exemplified by (i) mixing component (B) with component (C) to pretreat the surface of component (B) with component (C), and then adding component (B) to component (A); or (ii) mixing component (A) with component (B), and then admixing component (C) to treat the surface of component (B) with component (C), while component (B) resides in component (A). The latter method (ii) is preferred. Component (C) can be present in the inventive composition in the form afforded by the surface treatment of component (B) or can be freely present in the inventive composition. Treatment of component (B) by component (C) can be accelerated by heating, or by the addition of a catalytic quantity of an acid such as acetic acid or phosphoric acid, or by the addition of a catalytic quantity of a base such as a trialkylamine, quaternary ammonium salt, ammonia gas, or ammonium carbonate.

The inventive composition can be rendered curable by the addition of (D) a curing agent. When it is desired for the composition to be curable by the hydrosilylation reaction, the curing agent (D) will comprise platinum catalyst and organopolysiloxane containing an average of at least 2 silicon-bonded hydrogen atoms per molecule. The silicon-bonded groups in this organopolysiloxane can be exemplified by the same straight-chain alkyl, branched-chain alkyl, cyclic alkyl, aryl, aralkyl, and halogenated alkyl already listed above, wherein alkyl and aryl are preferred and methyl and phenyl are specifically preferred. While the viscosity of this organopolysiloxane at 25° C. is not restricted, this value is preferably 1 to 100,000 mPa·s, and more preferably is 1 to 5,000 mPa·s. The molecular structure of the subject organopolysiloxane is also not restricted and can be exemplified by straight-chain, partially branched straight-chain, cyclic, and dendritic molecular structures. The subject organopolysiloxane can be a homopolymer having a molecular structure as listed above, or a copolymer composed of a molecular structure as listed above, or a mixture of such polymers.

The organopolysiloxane in component (D) is exemplified by
dimethylhydrogensiloxy-endblocked dimethylpolysiloxanes;
trimethylsiloxy-endblocked dimethylsiloxane-methylhydrogensiloxane copolymers;
dimethylhydrogensiloxy-endblocked dimethylsiloxane-methylhydrogensiloxane copolymers;
organosiloxane copolymers consisting of $(CH_3)_3SiO_{1/2}$ siloxane unit, $(CH_3)_2HSiO_{1/2}$ siloxane unit, and $SiO_{4/2}$ siloxane unit; and
mixtures of two or more selections from the preceding.

The organopolysiloxane in component (D) should be present in the inventive composition in the quantity necessary for cure of the composition. In specific terms, this organopolysiloxane should be present in an amount that provides, per 1 mole silicon-bonded alkenyl in component (A), preferably from 0.1 to 10 moles, more preferably from 0.1 to 5 moles, and particularly preferably from 0.1 to 3.0 moles silicon-bonded hydrogen in this organopolysiloxane. Cure of the resulting silicone composition will tend to be unsatisfactory when the content of this component falls below the lower limit on the aforementioned range. When the upper limit on the aforementioned range is exceeded, the ultimately obtained cured silicone will be very hard and there is a tendency for numerous cracks to be produced in its surface.

The platinum catalyst is a catalyst that accelerates cure of the inventive composition and can be exemplified by chloroplatinic acid, alcohol solutions of chloroplatinic acid, olefin complexes of platinum, alkenylsiloxane complexes of platinum, and carbonyl complexes of platinum.

The platinum catalyst should be present in the inventive composition in the quantity required for cure of the composition. In specific terms, a quantity providing from 0.01 to 1,000 weight-ppm platinum metal from the platinum catalyst component with reference to component (A) is preferred, while a quantity providing from 0.1 to 500 ppm platinum metal from the platinum catalyst component with reference to component (A) is particularly preferred. The resulting silicone composition will tend to evidence an inadequate cure when the content of platinum catalyst falls below the lower limit on the aforementioned range, while additions in excess of the upper limit on the aforementioned range do not significantly increase the cure rate of the resulting silicone composition.

When it is desired for the inventive composition to be curable by a condensation reaction, the curing agent (D) will characteristically comprise silane or siloxane oligomer having at least 3 silicon-bonded hydrolyzable groups in each molecule and optionally a condensation catalyst. The silicon-bonded hydrolyzable groups in the silane can be exemplified by the same alkoxy, alkoxyalkoxy, acyloxy, ketoxime, alkenoxy, amino, aminoxy, and amide groups as already listed above. In addition to the hydrolyzable groups, the silicon in the silane can be bonded to the same straight-chain alkyl, branched-chain alkyl, cyclic alkyl, alkenyl, aryl, aralkyl, and halogenated alkyl as already identified above. The subject silane and siloxane oligomer can be exemplified by tetraethoxysilane, methyltriethoxysilane, vinyltriethoxysilane, methyltris(methyl ethyl ketoxime)silane, vinyltriacetoxysilane, and ethyl orthosilicate.

This silane or siloxane oligomer should be present in the inventive composition in the quantity required for cure of the composition. In specific terms, the range of 0.01 to 20 parts by weight per 100 parts by weight of component (A) is preferred while the range of 0.1 to 10 parts by weight per 100 parts by weight of component (A) is particularly preferred. Problems such as a decline in the storage stability of the resulting composition and a decline in adhesiveness appear when the silane or siloxane oligomer content falls below the lower limit on the aforementioned range. Cure by the composition becomes very slow when the upper limit on the aforementioned range is exceeded.

The condensation catalyst is an optional component and is unnecessary when the silane used as curing agent contains hydrolyzable groups such as the aminoxy group, amino group, or ketoxime group. The condensation catalyst under consideration can be exemplified by organotitanate esters such as tetrabutyl titanate and tetraisopropyl titanate; organotitanium chelate compounds such as diisopropoxybis (acetylacetate)titanium and diisopropoxybis(ethyl acetoacetate)titanium; organoaluminum compounds such as aluminum tris(acetylacetonate) and aluminum tris(ethyl acetoacetate); organozirconium compounds such as zirconium tetra(acetylacetonate) and zirconium tetrabutyrate; organotin compounds such as dibutyltin dioctoate, dibutyltin dilaurate, and butyltin 2-ethylhexoate; the metal salts of carboxylic acids, such as tin naphthenate, tin oleate, tin butyrate, cobalt naphthenate, and zinc stearate; amine compounds and salts thereof such as hexylamine and dodecylamine phosphate; quaternary ammonium salts such as benzyltriethylammonium acetate; the lower fatty acid salts of alkali metals, such as potassium acetate and lithium nitrate; dialkylhydroxylamines such as dimethylhydroxylamine and diethylhydroxylamine; and guanidyl-functional organosilicon compounds.

The condensation catalyst is added to the inventive composition on an optional basis and should be added in the quantity required for cure of the composition. In specific terms, 0.01 to 20 parts by weight per 100 parts by weight of component (A) is preferred, while 0.1 to 10 parts by weight per 100 parts by weight of component (A) is particularly preferred. Assuming this catalyst is necessary, cure of the resulting composition will become increasingly unsatisfactory as the content of this catalyst declines below the lower limit on the aforementioned range. The storage stability of the resulting composition declines when the upper limit on the aforementioned range is exceeded.

Component (D) will be an organoperoxide when it is desired for the inventive composition to be curable by an organoperoxide-induced free radical reaction. This organoperoxide can be exemplified by benzoyl peroxide, di(p-methylbenzoyl)peroxide, di(o-methylbenzoyl)peroxide, dicumyl peroxide, 2,5-dimethyl-2,5-bis(tert-butylperoxy) hexane, di-tert-butyl peroxide, and tert-butyl peroxybenzoate. The organoperoxide should be present in the inventive composition in the quantity required for cure of the composition and in specific terms is preferably present at 0.1 to 5 parts by weight per 100 parts by weight of component (A).

The inventive composition can contain other components on an optional basis insofar as the object of this invention is not impaired. These optional components can be exemplified by fillers such as fumed silica, precipitated silica, and fumed titanium oxide; fillers as afforded by hydrophobicizing the surface of the aforementioned fillers with an organosilicon compound; pigments; dyes; fluorescent dyes; heat stabilizers; flame retardants other than triazole compounds; plasticizers; and adhesion promoters.

When in particular the inventive composition cures through the hydrosilylation reaction, it may also contain a cure reaction inhibitor to adjust the cure rate of the composition and improve its handling characteristics. This cure reaction inhibitor can be exemplified by acetylenic compounds such as 2-methyl-3-butyn-2-ol, 2-phenyl-3-butyn-2-ol, and 1-ethynyl-1-cyclohexanol; ene-yne compounds such as 3-methyl-3-penten-1-yne and 3,5-dimethyl-3-hexen-1-yne; and also by hydrazine compounds, phosphine compounds, and mercaptan compounds. While the content of this cure reaction inhibitor is not restricted, it is preferably added at from 0.0001 to 1.0 weight % with reference to the composition.

The composition according to the present invention takes the form of a grease, slurry, paste, or clay-like dough at ambient temperature. The method for inducing cure is not restricted in the case of the curable composition and can be exemplified by molding the composition and then holding it at room temperature or heating it to 50 to 200° C. The nature of the cured silicone thereby afforded is also not specifically delimited, and the cured silicone can be, for example, a gel, low-hardness rubber, or high-hardness rubber. A type A durometer hardness as specified in JIS K 6253 of 10 to 95 is preferred because this affords good handling characteristics and enables good adherence to substrate when the cured silicone is used as a heat-dissipating material.

EXAMPLES

The thermoconductive silicone composition according to this invention will be described in greater detail through working examples. The property values reported in the examples were measured at 25° C.

Example 1

A thermoconductive silicone rubber base was prepared by mixing the following with a mixer: 6.42 parts by weight of a dimethylvinylsiloxy-endblocked dimethylpolysiloxane with a viscosity of 400 mPa·s and a vinyl content of 0.44 weight %, 55.2 parts by weight of a spherical alumina powder with an average particle size of 40 μm, 36.8 parts by weight of an irregularly shaped alumina powder with an average particle size of 2.2 μm, 0.5 parts by weight of a dimethylpolysiloxane with the following formula

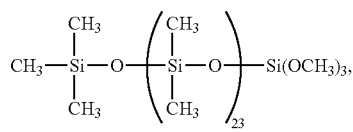

and 0.5 parts by weight of a dimethylpolysiloxane with the following formula

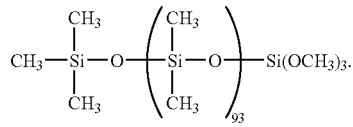

A thermoconductive silicone rubber composition was then prepared as follows. The following were first mixed into the aforementioned rubber base:

0.28 parts by weight of a trimethylsiloxy-endblocked dimethylsiloxane-methylhydrogensiloxane copolymer with a viscosity of 5 mPa·s, an average of 5 silicon-bonded hydrogen atoms in each molecule, and a silicon-bonded hydrogen atom content of 0.74 weight % (the specified quantity of addition gave 2.0 moles silicon-bonded hydrogen atoms in this component per 1 mole vinyl in the dimethylpolysiloxane in the rubber base);

as adhesion promoter, 0.2 parts by weight of a 1:1 mixture (weight ratio) of a silanol-endblocked dimethylsiloxane-methylvinylsiloxane copolymer (viscosity=19 mPa·s, vinyl content=9.6 weight %) and 3-glycidoxypropyltrimethoxysilane; and as cure reaction inhibitor, 0.05 parts by weight of 1-ethynyl-1-cyclohexanol.

In a final step, 0.05 parts by weight of a 1,3-divinyl-1,1,3,3-tetramethyldisiloxane complex of platinum (platinum content=0.5 weight %) was admixed to give the thermoconductive silicone rubber composition.

The properties of the thermoconductive silicone rubber composition and thermoconductive silicone rubber were measured as described below, and the results are reported in Table 1.

Penetration of the Thermoconductive Silicone Rubber Composition

The one-quarter penetration of the thermoconductive silicone rubber composition was measured based on the method described in JIS K 2220. Larger penetration values denote a higher plasticity for the thermoconductive silicone rubber composition and better handling characteristics.

Moldability of the Thermoconductive Silicone Rubber Composition

The thermoconductive silicone rubber composition was sandwiched between 0.2 mm-thick tetrafluoroethylene films so as to give a thickness of 2 mm and was then cured by heating for 15 minutes at 150° C. The tetrafluoroethylene films were subsequently peeled off and the capacity for molding into a silicone rubber sheet was evaluated. The ability to form a uniform silicone rubber sheet was evaluated as an "excellent moldability" and was assigned "○". An evaluation of "fair moldability" (denoted by "Δ") was rendered when a sheet could be formed, but some low-strength spots were present. An evaluation of "poor moldability" (denoted by "x") was rendered when either (i) a sheet could not be molded or (ii) when a sheet could be molded but the sheet exhibited a low strength.

Thermal Conductivity of the Thermoconductive Silicone Rubber

Thermoconductive silicone rubber sheets with an area of 1 cm×1 cm and a thickness of 1 mm or 2 mm were fabricated by curing the thermoconductive silicone rubber composition by heating for 15 minutes at 150° C. The thermal resistance of the resulting thermoconductive silicone rubber was measured by a steady-state method at 50° C. using an instrument for measuring the thermal resistance of resins (Hitachi, Ltd.) and the thermal conductivity was calculated from the value obtained for the thermal resistance.

Hardness of the Thermoconductive Silicone Rubber

Thermoconductive silicone rubber was fabricated by curing the thermoconductive silicone rubber composition by heating for 15 minutes at 150° C. The hardness of the thermoconductive silicone rubber was then measured using the type A durometer specified in JIS K 6253.

Adhesive Strength of the Thermoconductive Silicone Rubber

The thermoconductive silicone rubber composition was sandwiched between adherends (aluminum plates (JIS H 4000, A1050P) from Paltec Co., Ltd.) and was cured by heating for 30 minutes at 150° C. The area of adhesion was 25 mm×10 mm, and the thickness of the adhesive layer was 1 mm. The tensile shear adhesive strength of the thermoconductive silicone rubber was measured as described in JIS K 6249.

Comparative Example 1

A thermoconductive silicone rubber composition was prepared as in Example 1, but in this case using 1.0 part by weight of a dimethylpolysiloxane with the following formua

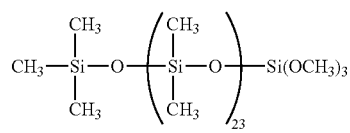

in place of the 0.5 parts by weight of a dimethylpolysiloxane with the formula

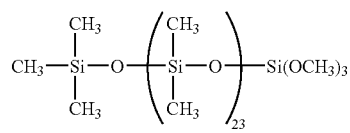

and 0.5 parts by weight of a dimethylpolysiloxane with the formula

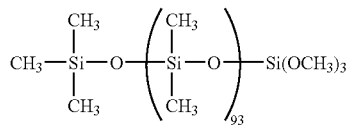

that were used in Example 1.

The properties of this thermoconductive silicone rubber composition and the thermoconductive silicone rubber were measured as in Example 1, and the results are reported in Table 1.

TABLE 1

|  |  | Example 1 | Comparative Example 1 |
|---|---|---|---|
| Penetration | (mm/10) | 112 | 95 |
| Moldability |  | ○ | Δ |
| thermal conductivity | (W/m · K) | 4.09 | 3.87 |
| Hardness |  | 90 | 90 |
| adhesive strength | (N/cm²) · aluminum plate | 117 | 75 |

Example 2

A thermoconductive silicone grease was prepared by mixing the following with a Ross® mixer: 4.0 parts by weight of a trimethylsiloxy-endblocked dimethylpolysiloxane with a viscosity of 110 mPa·s, 57.0 parts by weight of a spherical alumina powder with an average particle size of 40 μm, 38.0 parts by weight of an irregularly shaped alumina powder with an average particle size of 2.2 μm, 0.2 parts by weight of a dimethylpolysiloxane with the formula

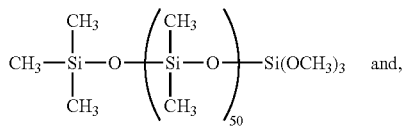 and, 0.8 parts by weight of a dimethylpolysiloxane with the formula

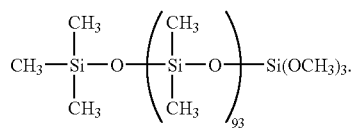

The properties of this thermoconductive silicone grease were measured as described below and the results are reported in Table 2.

Penetration of the Thermoconductive Silicone Grease

The one-quarter penetration of the thermoconductive silicone grease was measured according to the method described in JIS K 2220.

Thermal Conductivity of the Thermoconductive Silicone Grease

The thermal resistance of the thermoconductive silicone grease (area=1 cm×1 cm, thickness=100 μm and 200 μm) was measured by a steady-state method at 50° C. using an instrument for measuring the thermal resistance of resins (Hitachi, Ltd.) and the thermal conductivity was calculated from the value obtained for the thermal resistance.

Example 3

A thermoconductive silicone grease was prepared as in Example 2, except that in this case 0.2 parts by weight of a dimethylpolysiloxane with the formula

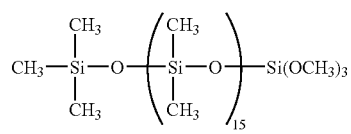

was used in place of the 0.2 parts by weight of a dimethylpolysiloxane with the formula

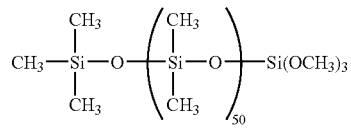

that was used in Example 2.

The properties of this thermoconductive silicone grease were measured as in Example 2, and the results are reported in Table 2.

Comparative Example 2

A thermoconductive silicone grease was prepared as in Example 2, except that in this case 1.0 part by weight of a dimethylpolysiloxane with the formula

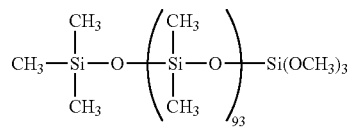

was used in place of the 0.2 parts by weight of a dimethylpolysiloxane with the formula

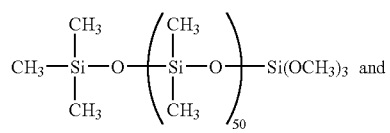 and 0.8 parts by weight of a dimethylpolysiloxane with the formula

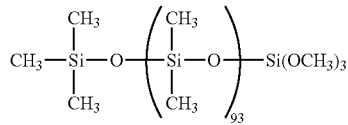

that were used in Example 2. The properties of this thermoconductive silicone grease were measured as in Example 2, and the results are reported in Table 2.

Comparative Example 3

A thermoconductive silicone grease was prepared as in Comparative Example 2, except that in this case 1.0 part by weight of a dimethylpolysiloxane with the formula

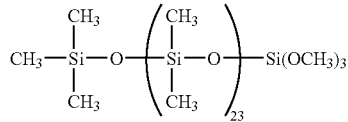

was used in place of the 1.0 part by weight of a dimethylpolysiloxane with the formula

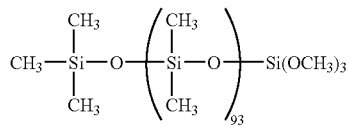

that was used in Comparative Example 2. The properties of this thermoconductive silicone grease were measured as in Example 2, and the results are reported in Table 2.

TABLE 2

|  | Example 2 | Example 3 | Comparative Example 2 | Comparative Example 3 |
|---|---|---|---|---|
| penetration (mm/10) | 105 | 111 | 93 | 63 |
| thermal conductivity (W/m · K) | 3.60 | 4.24 | 2.98 | 4.01 |

INDUSTRIAL APPLICABILITY

The thermoconductive silicone composition according to this invention exhibits excellent handling characteristics despite containing a large amount of thermoconductive filler to used to obtain a highly thermoconductive silicone composition.

The invention claimed is:

1. A composition comprising:
   (A) an organopolysiloxane, wherein component (A) excludes component (C),
   (B) a thermoconductive filler, and
   (C) at least two organopolysiloxanes as defined by the following general formula that have different values for the subscript n

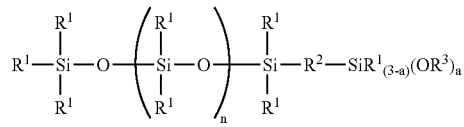

wherein each $R^1$ is independently selected from monovalent hydrocarbon groups; $R^2$ is an oxygen atom or divalent hydrocarbon group; $R^3$ is an alkyl, alkoxyalkyl, alkenyl, or acyl; n is an integer from 5 to 100; and a is an integer from 1 to 3; and wherein the at least two organopolysiloxanes of component (C) have subscripts n in the general formula that differ by at least 10.

2. The composition of claim 1, wherein component (B) has an average particle size of 0.1 to 100 μm.

3. The composition of claim 1, wherein component (B) is an alumina powder.

4. The composition of claim 1, wherein component (B) is a mixture comprising
   ($B_1$) a spherical alumina powder with an average particle size of greater than 5 to 50 μm, and
   ($B_2$) a spherical or irregularly shaped alumina powder with an average particle size of 0.1 to 5 μm.

5. The composition of claim 4, wherein component (B) comprises 30 to 90 weight % of component ($B_1$) and 10 to 70 weight % of component ($B_2$).

6. The composition of claim 1, wherein the content of component (B) is 500 to 2,500 parts by weight per 100 parts by weight of component (A).

7. The composition of claim 1 wherein the weight ratio in component (C) of the organopolysiloxane with the larger value of n in the formula to the organopolysiloxane with the smaller value of n is 1:10 to 10:1.

8. The composition of claim 1, wherein the content of component (C) is 0.1 to 10 parts by weight per 100 parts by weight of component (B).

9. The composition of claim 1, wherein the surface of component (B) is surface treated with component (C).

10. The composition of claim 1, wherein the composition further comprises (D) a curing agent, and the composition is curable.

11. The composition of claim 10, wherein the composition is cured by a hydrosilylation reaction, condensation reaction, or organoperoxide-induced free radical reaction.

12. The composition of claim 10, wherein the composition is cured by a hydrosilylation reaction.

13. The composition of claim 10, wherein the composition cures to form a thermoconductive silicone gel or a thermoconductive silicone rubber.

* * * * *